United States Patent [19]
Bakker et al.

[11] Patent Number: 5,249,410
[45] Date of Patent: Oct. 5, 1993

[54] DEVICE FOR HEAT SHRINKING FILM ONTO AN OPEN-TOPPED CONTAINER

[76] Inventors: William J. Bakker, R.R. #1, Orangeville, Ontario L9W 2Y8; N. A. Williams, 42, Addison Crescent, Don Mills, Ontario, M3B 1K8, both of Canada

[21] Appl. No.: 873,844

[22] Filed: Apr. 27, 1992

[51] Int. Cl.⁵ .............................................. B65B 53/02
[52] U.S. Cl. ...................................... 53/557; 53/329.3; 53/329.5; 156/379.9; 156/380.9
[58] Field of Search ............... 53/329.2, 329.3, 557, 53/329.5, 373.8; 156/379.8, 379.9, 380.9

[56] References Cited

U.S. PATENT DOCUMENTS

| | | | |
|---|---|---|---|
| 3,260,775 | 7/1966 | Orr | 264/94 |
| 3,324,625 | 6/1967 | Dulmage | 53/557 X |
| 3,345,797 | 10/1967 | Von Stoeser | 53/329.3 X |
| 3,354,604 | 11/1967 | Amberg et al. | 53/42 |
| 3,460,317 | 8/1969 | Carter et al. | 53/329 |
| 3,491,510 | 1/1970 | Sternau | 53/42 |
| 3,494,098 | 2/1970 | Sternau | 53/329 |
| 3,507,093 | 4/1970 | Marion | 53/141 |
| 3,514,299 | 5/1970 | Thanhauser | 53/329.3 X |
| 3,621,637 | 11/1971 | Sternau | 53/329 |
| 3,703,066 | 11/1972 | Marion et al. | 53/329.3 X |
| 3,800,502 | 4/1974 | Vermeulen | 53/329.2 |
| 3,801,246 | 4/1974 | Gustavsson | 53/557 X |
| 3,838,550 | 10/1974 | Mueller | 53/39 |
| 3,838,805 | 10/1974 | Amberg | 53/329.2 X |
| 3,877,200 | 4/1975 | Feldman | 53/67 |
| 3,916,602 | 11/1975 | Doty | 53/329 |
| 4,011,119 | 3/1977 | Mitchell et al. | 156/69 |
| 4,035,987 | 7/1977 | Nakazato et al. | 53/133 |
| 4,092,817 | 6/1978 | Rist, III | 53/329.3 X |
| 4,134,248 | 1/1979 | Freeman | 53/329.3 X |
| 4,184,310 | 1/1980 | Shelby | 53/412 |
| 4,226,072 | 10/1980 | Balzer et al. | 53/329.3 X |
| 4,562,688 | 1/1986 | Mueller | 53/399 |
| 5,113,479 | 5/1992 | Anderson et al. | 156/380.9 X |

FOREIGN PATENT DOCUMENTS 3-148429  6/1991  Japan ................................ 53/557

*Primary Examiner*—John Sipos
*Assistant Examiner*—Daniel Moon

[57] ABSTRACT

A device for heat shrinking thin film onto open-topped containers to form spill-resistant covers is shown. A radiant energy source is intermittently energized in association with timers to direct radiant energy towards the thin film. An energy absorbing body is associated with the thin film to absorb energy and create heat adjacent to the film which in turn causes the thin film to shrink. The energy absorbing body can be the adaptation of the thin film to be opaque to the radiant energy by either being coated with an energy absorbing coating such as printing, or being made partially opaque by means of tinting. The container can also be adapted to absorb energy by including a darkened band adjacent the upper edge of the rim. The device can also interpose an energy absorbing body, such as a darkened aluminum screen adjacent to the film to be heated to cause the thin film to shrink. The device shrinks the thin film around the rim first, then shrinks the film across the top of the container to form a spill-resistant cover. In one embodiment, printed patterns on the film can be used to create perforations.

23 Claims, 7 Drawing Sheets

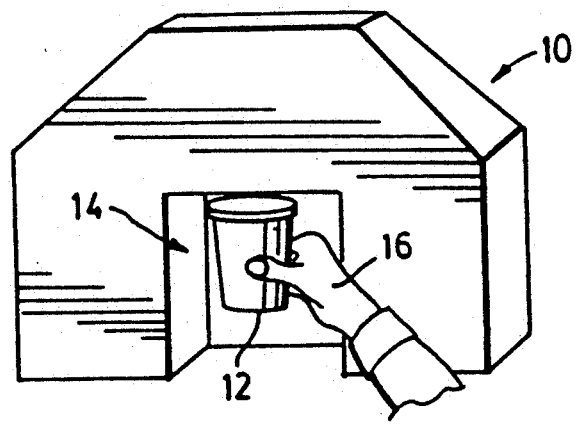
FIG. 1
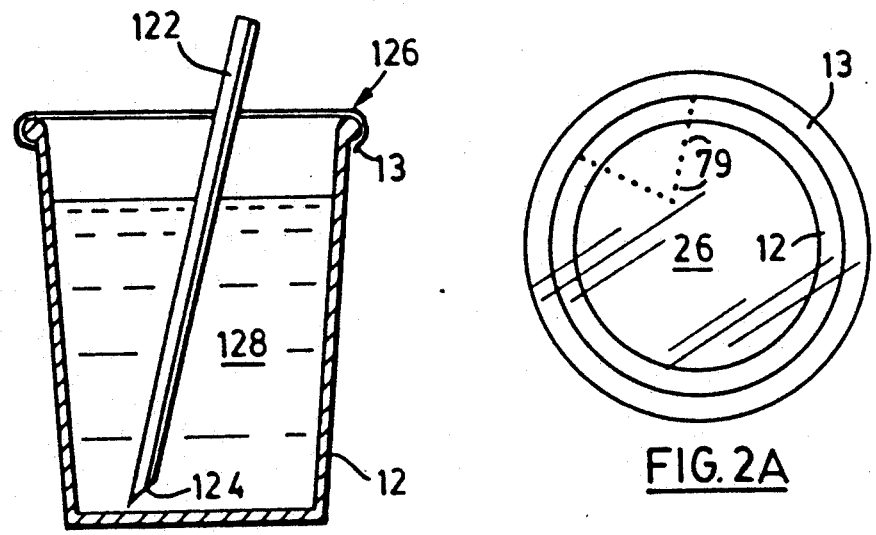
FIG. 2
FIG. 2A
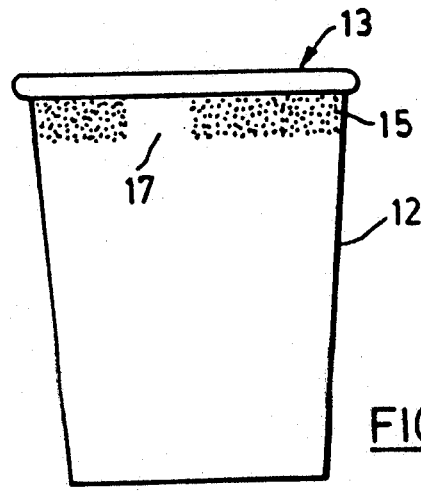
FIG. 3

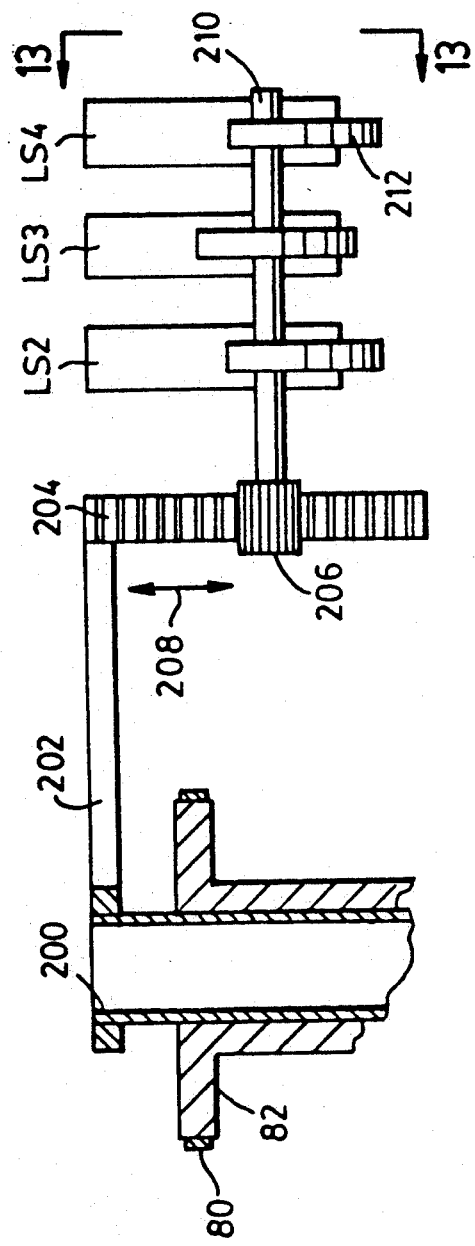
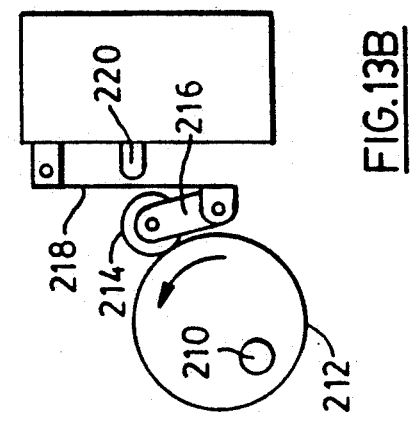
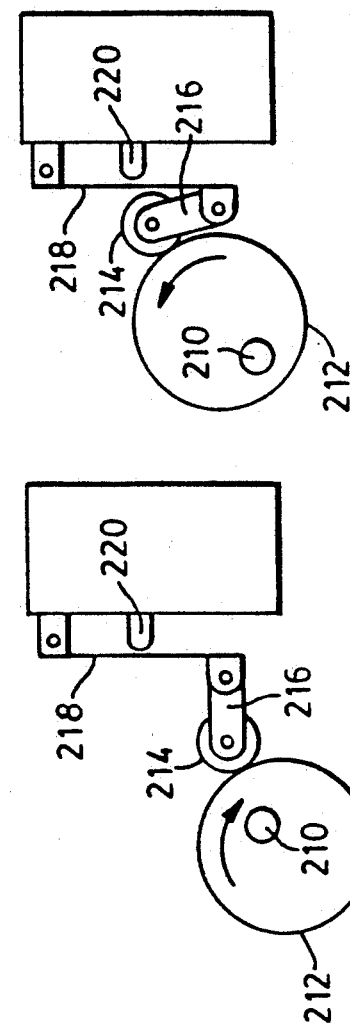
FIG.12
FIG.13A
FIG.13B

DEVICE FOR HEAT SHRINKING FILM ONTO AN OPEN-TOPPED CONTAINER

FIELD OF THE INVENTION

This invention relates to a device which may be used to seal food into open-topped containers. In particular, this invention relates to a device suitable for heat shrinking film onto such open-topped containers to seal food or drink inside the container.

BACKGROUND OF THE INVENTION

Presently in the fast food drink industry it is typical to serve a drink in a paper, plastic or other disposable cup topped with a preformed plastic lid. The plastic lid fits tightly over the lip formed at the top of, for example, a paper drink cup, and may include apertures to permit straws or openings to be formed in the lid to directly drink the contents of the cup.

Unfortunately, there are many problems associated with the use of these plastic lids. For example, the lids are generally expensive. Further, the lids are bulky and create problems in storage and in disposal. Further, the seal formed by the lids is dependant upon the lid being placed on properly, and can leak if not properly placed. Finally, the handling of the lid is not completely hygienic.

In order to overcome these problems, various devices and methods have been proposed in which a cover is placed on an open-topped container and then heated to shrink it into sealing engagement with the top of such a container. Examples of such devices can be found in the following United States patents: U.S. Pat. Nos. 3,260,775; 3,354,604; 3,460,317 3,491,510; 3,494,098; 3,507,093; 3,621,637; 3,877,200; 3,838,550; 3,916,602; 4,035,987; 4,184,310 and 4,562,688. While the solutions proposed by these prior devices and methods are interesting, they fail to provide a sufficiently cost efficient, easy and inexpensive alternative to preformed rigid plastic lids. As a consequence, rigid plastic lids remain in widespread use. Some of the main failings of these prior devices are that they are bulky, noisy, unresponsive, and expensive. Heating systems comprising blowing air over a hot element and then onto a film require large amounts of unnecessary heat, even when in standby mode, which makes temperature control very difficult. Further, continuous elevated temperatures are expensive to maintain and may be deleterious to the immediate environment.

SUMMARY OF THE INVENTION

Aside from the benefits of increased hygiene and reduced waste, the present invention is directed to providing a practical device which has commercial utility. One aspect of the present device is to provide an energy efficient way of sealing open-topped containers which avoids any substantial build-up of heat. An intermittent source of radiant energy is used, and energy is directed onto an energy absorber located at the specific place where heat is required. Thus, heat is originated where it is needed, when it is needed and a cooler, quieter, safer and more efficient device results.

The present invention provides a device for heat shrinking a cover onto an open-topped container, said device comprising:

a housing adapted to receive said container; and having a strip of heat shrinkable thin film;

a cutting means positioned against said thin film for cutting said thin film upon said thin film being urged onto said cutting means by said container;

a hood for holding a cut piece of said film in place across said open top of said container, wherein said cut piece includes a portion extending from under said hood downwardly around an upper outer rim of said container;

a first radiant energy source for directing energy toward said downwardly extending portion of said cut piece of film;

a first means to absorb radiant energy to transfer heat to said downwardly extending portion of said cut piece of film; and a switch means for intermittently energizing said first radiant energy source whereby said downwardly extending portion of said cut piece of film is shrunk onto said rim.

BRIEF DESCRIPTION OF THE DRAWINGS

FIG. 1 is a perspective view of a device according to the present invention in use;

FIG. 2 is a front sectional view of an open-topped container according to the present invention with a heat shrunk cover in place;

FIG. 2a is a top view of the container of FIG. 2.

FIG. 3 is a front view of the container of FIG. 2 having a darkened upper band;

FIG. 12 is an alternate embodiment of a microswitch system according to the present invention;

FIG. 13a is a view along lines 13—13 of FIG. 12 in a first position; and

FIG. 13b is a view along lines 13-13 of FIG. 12 in a second position.

DETAILED DESCRIPTION OF THE PREFERRED EMBODIMENT

Figure 4:
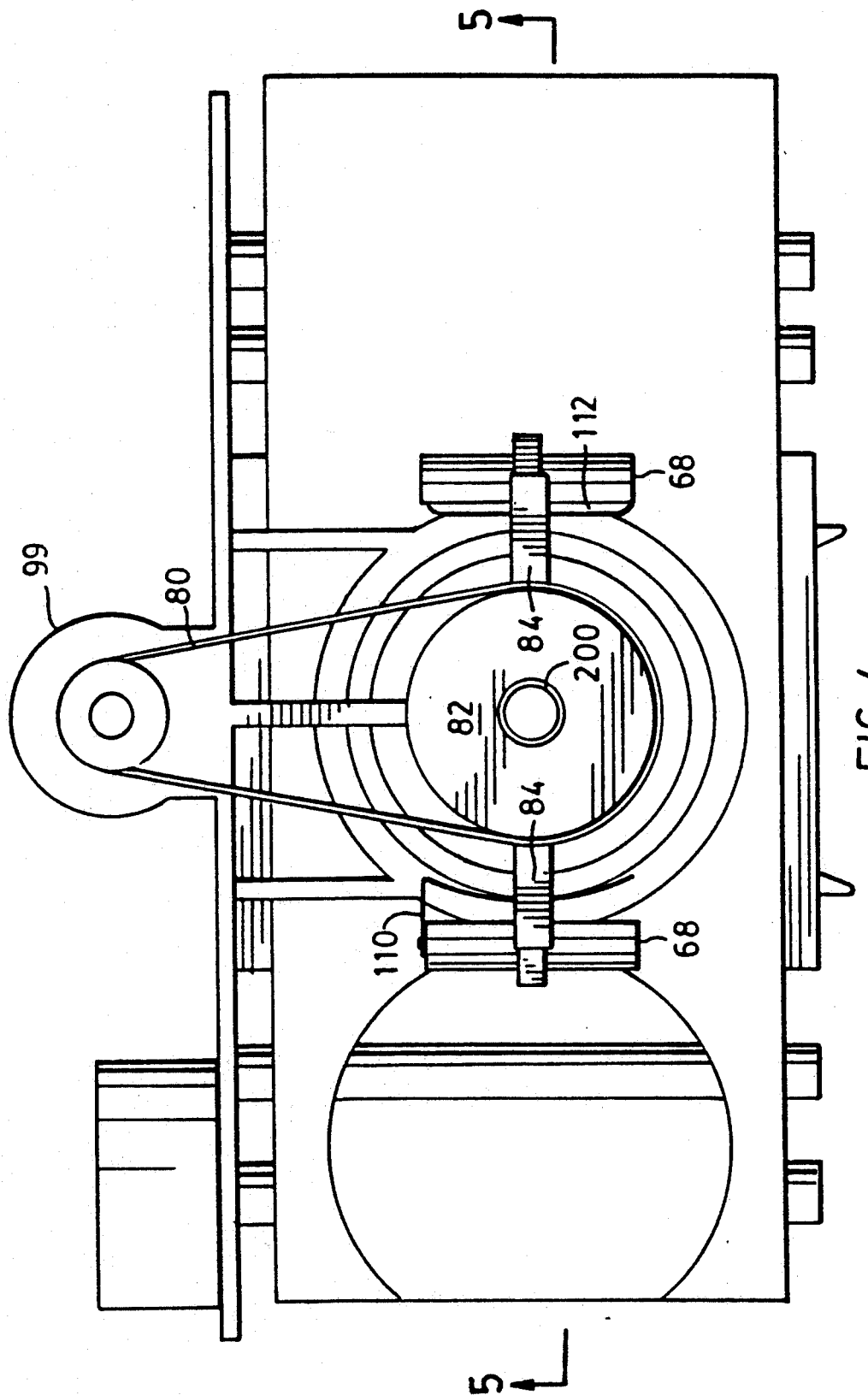
FIG. 4 is a top view of the device of FIG. 1, with the top wall broken away to show the contents.

FIG. 1 shows a device 10 for heat shrinking a thin film onto an open-topped container 12. The housing 10 includes an opening 14 of sufficient size to allow placement of the container 12 within the housing 10. In the embodiment of FIG. 1, placement of the container 12 within the opening 14 is accomplished manually, illustrated by a hand 16.

Figure 5:
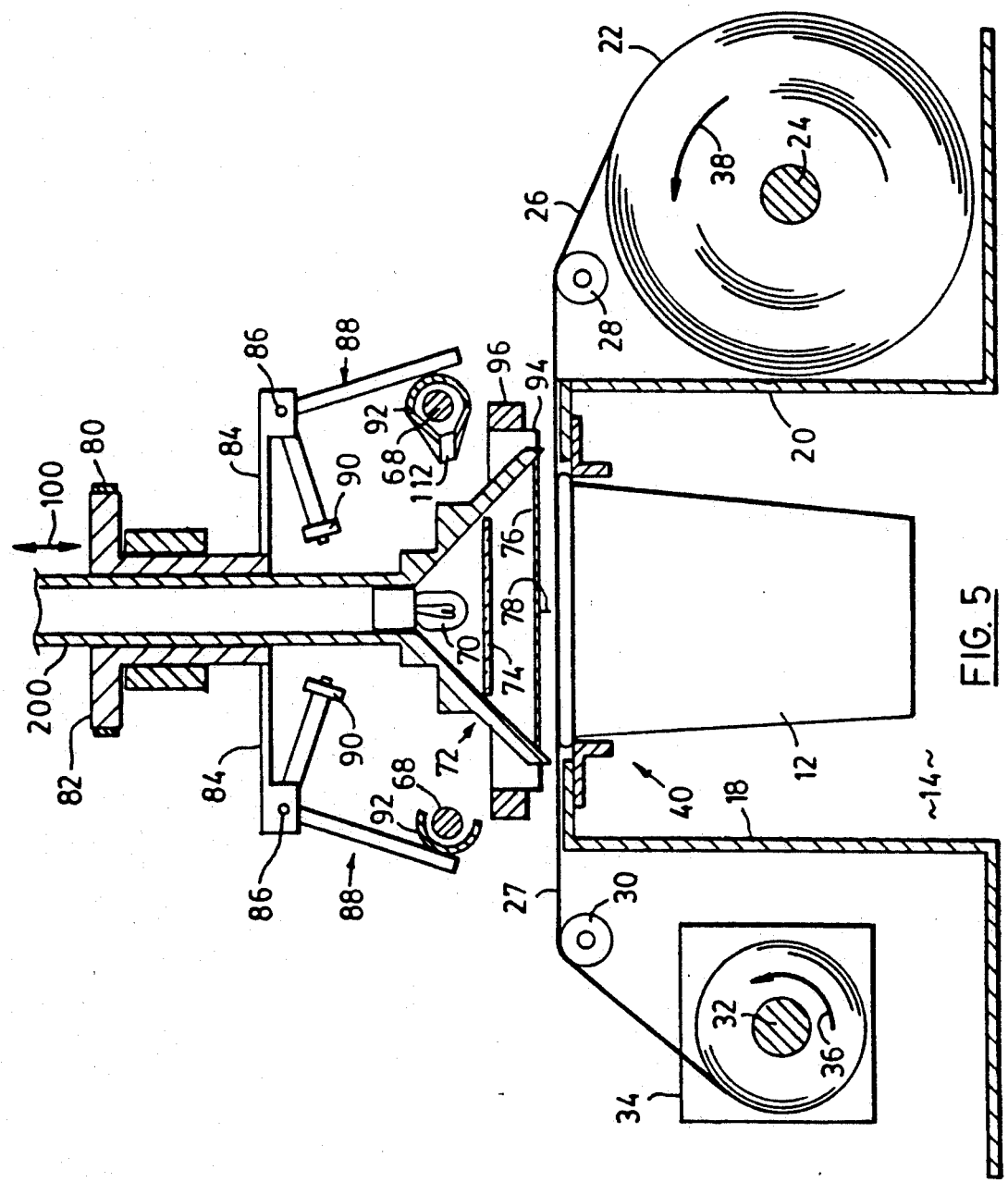
FIG. 5 is a sectional view taken along lines 5—5 of FIG. 4.

Turning to FIG. 5, there is shown a cross-sectional schematic view of the operational components of the device 10 of FIG. 1. The container 12 is shown in the opening 14. The opening 14 is defined by side walls 18 and 20 of the device 10. Shown on the right-hand side is a roll of thin plastic film 22 on an axle 24. The film 26 passes over a roller 28 across the top of the container 12 across a second roller 30 and onto a take-up axle 32. Shown at 34 is a rewind motor. It will be appreciated that the rewind motor 34 can rotate the pick-up axle 32 in the direction of arrow 36 which will advance the film 26 across the top of the container 12 and cause the roll of film 22 to rotate in the direction of arrow 38. Alternatively, the advancing of the film 26 could be accomplished manually by turning a lever or knob mounted on take-up axle 32.

The film 26 is preferably a bi-axially oriented shrink film having a preferred thickness of between 40 to 120 gauge with the most preferred being between 60 to 100 gauge. Good results have been achieved with a 75 gauge polyvinyl chloride film purchased from Reynolds Metals Company at Richmond, Va. Other films, such as copolymers, polyolefins and the like may also be appropriate. The film, to be most useful, must be food-grade contact-approved by the appropriate regulatory authorities. A 7½" outer diameter roll of 75 gauge shrink film, which includes a 3" diameter fibre core, will yield approximately 8,000 covers according to the present invention.

Figure 7:
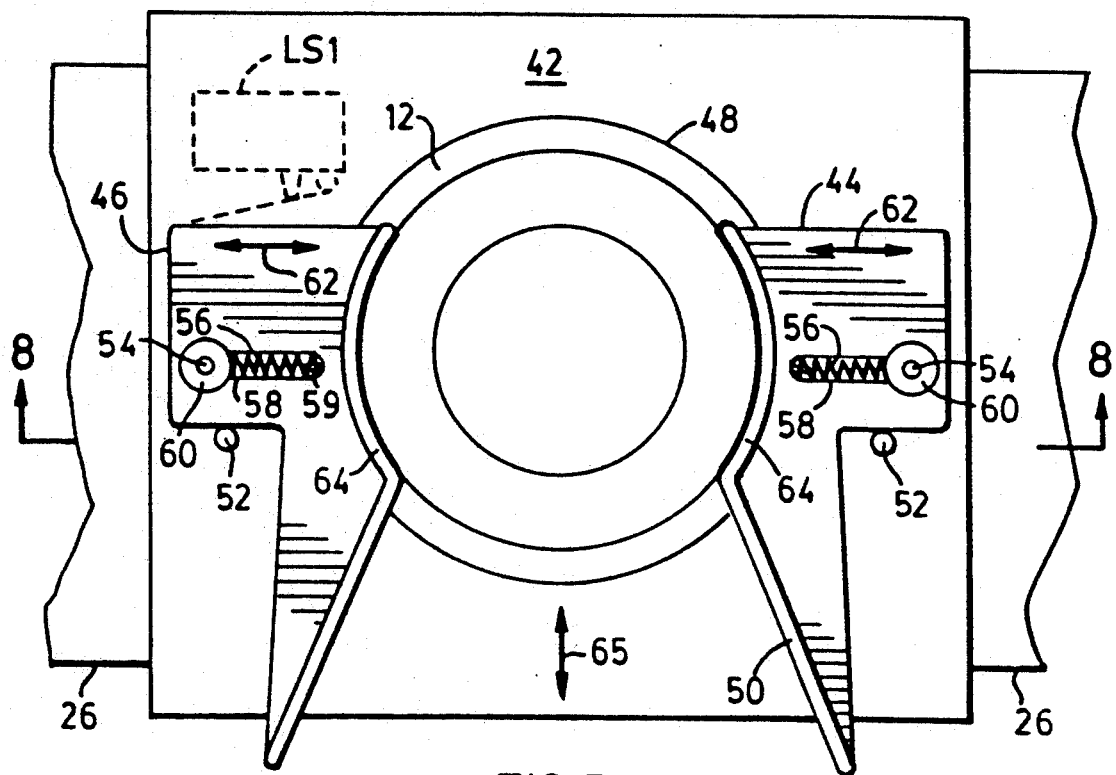
FIG. 7 is a view of a part of the device of FIG. 1.

In FIG. 5, the container 12 is located in a locator identified generally at 40. The locator 40 is shown in more detail in FIGS. 7 and 8. Turning to FIG. 7, there is shown a plate 42 having a pair of opposed guides 44 and 46. The plate 42 also has an opening 48 located between the guides 44, 46. The guides 44 and 46 are substantially identical and therefore the following discussion in respect of guide 44 applies equally to guide 46.

The guide 44 comprises a rub rail 50 which contacts an outer edge of a container 12. Extending from plate 42 are two posts in respect of each guide 44, 46. In respect of guide 44 there is a stop post 52 and a guide post 54. A slot 56 is formed in the guide 44 and a spring 58 is housed between the guide post 54 and the end of the slot 56. A pin 59 may be used to secure one end of the spring 58. A washer 60 is used to retain the other end of the spring 58 within the slot 56. The washer 60 is placed around the guide post 54. Between the free end 55 of guide post 54 and the washer 60 is a further spring 61. The spring 61 allows the guide plate 44 to articulate away from the plate 42 to facilitate removal of the container 12 from the device 10.

It will now be appreciated that the guide 44 can move laterally in the direction of double ended arrow 62 guided by means of the stop 52 and the guide post 54 with the slot 56. It will also be appreciated that the curved portion 64 of the rub rail 50 will provide an indication to anyone inserting a container 12 into the locator that the container is appropriately located. Appropriately in this sense means centered under the plate opening 48.

Figure 8:
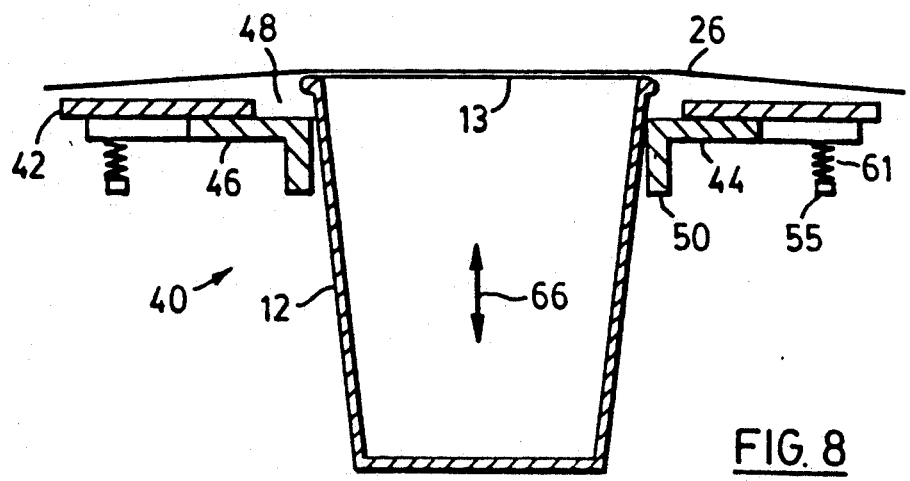
FIG. 8 is a view along lines 8—8 of FIG. 7.

Turning to FIG. 8, the locator 40 of FIG. 7 is shown in cross-sectional view. As can be seen, the guides 44 and 46 are positioned on adjacent side edges of a container 12. The plate opening 48 is shown together with the plate 42. The thin film 26 is also shown stretched across the top 13 of the container 12.

It can now be appreciated that the container 12 can be moved in the direction of double ended arrow 65 into position beneath plate opening 48. During this period, the guides 44 and 46 will gradually open and then close about the periphery of the container 12. Thereafter, as shown in FIG. 8, the container 12 is free to be moved in the direction of double ended arrows 66 as will be discussed below. It will be appreciated that containers 12 of varying diameter can thus be accommodated by the instant invention, since all containers will be centered by the locator beneath the plate opening 48. This is desirable in a food services environment where cup size selections typically include small, medium and large.

Turning now to FIG. 5, a container 12 is shown centered in locator 40. A first radiant energy source 68 and a second radiant heater 70 can now be explained. Located above the centered and located container 12 is a top shrink hood 72. The second radiant heater 70 is located within the top shrink hood 72. The top shrink hood 72 includes a glass shield 74 and a heat transfer means 76. In some circumstances the glass shield 74 may not be required, however, to prevent the possibility of splashes reaching the second radiant energy source 70, it is preferred. It may not be necessary to use glass. Plastic or other transparent substances may be appropriate. Good results have been achieved when the heat transfer means 76 is made from a screen aluminum material painted a dark colour, such as black. The dark aluminum heats and cools quickly which is desirable in the circumstances.

A pierce tool 78 is also shown extending outwardly from the heat transfer means 76. The purpose of the pierce tool 78 is to make a vent opening in the thin film to allow gases such as carbon dioxide from a soft drink to escape the container.

An alternative to pierce tool 78 is to form small opaque portions 79 in the shrink film. These opaque portions or "dots" will cause a hot point which may perforate the film as more fully explained below. If desired the hot points can be made in a specified pattern to form a sipping opening or the like, as shown in FIG. 2A. Also shown in FIG. 2 is a straw 122 with a pointed end 124 for piercing the film, shown in place as 126. A fluid, such as a soft drink is shown at 128.

Also shown in FIG. 5 is a drive belt 80 which connects a pulley 82 with a motor. Attached to the pulley 82 are a pair of arms 84. The arms 84 rotate when the pulley 82 is rotated by the belt 80. Depending from the arms 84 about pivot points 86 are pivot arms 88. Pivot arms 88 include a roller 90 at one end and the first radiant energy source 68 at the other end. If preferred, a reflector may be provided such as 92 around the first radiant energy source 68.

Also show in FIG. 5 is a knife or film cutting blade 94 to which is attached a heating element 96. The heated blade 94 ensures a quick clean cut of the thin film, upon the thin film contacting the blade 94. As can be seen from FIG. 5, the blade 94 is below the top hood 72, so the film will be cut to shape just prior to or about the same time as the container 12 contacts the hood 72. Good results have been achieved when the blade is made from a two point center face steel cutting rule, and maintained at a temperature of between 275° F. to 400° F. This format appears to limit smoke and fume generation.

Figure 9:
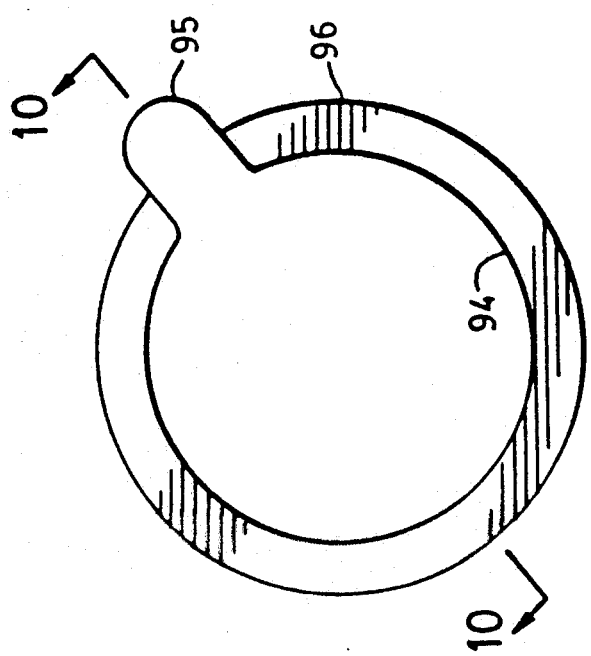
FIG. 9 is an alternate configuration for a knife element shown in FIG. 5.
Figure 10:
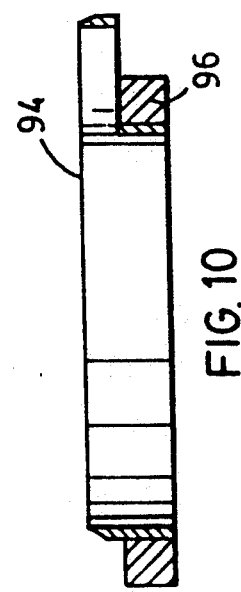
FIG. 10 is a view along lines 10—10 of FIG. 9.

The knife 94 may be circular in shape to provide a symmetrical overhand for a circular container, or may be as shown in FIGS. 9 and 10. It will be noted that the knife 94 in FIGS. 9 and 10 includes a rounded oblong section 95. This will result in a similarly shaped section being formed in a cut piece of film, as described below, which can be used as a convenient pull tab for removing a cover which has been shrunk onto a container 12. In the preferred embodiment the thin film 26 has a width greater than the width of the knife 94 so that a trim 27 (see FIG. 5) is left after the cut is made, and the trim 27 is strong enough to allow the film 26 to be advanced by a tensile force without tearing.

Figure 6:
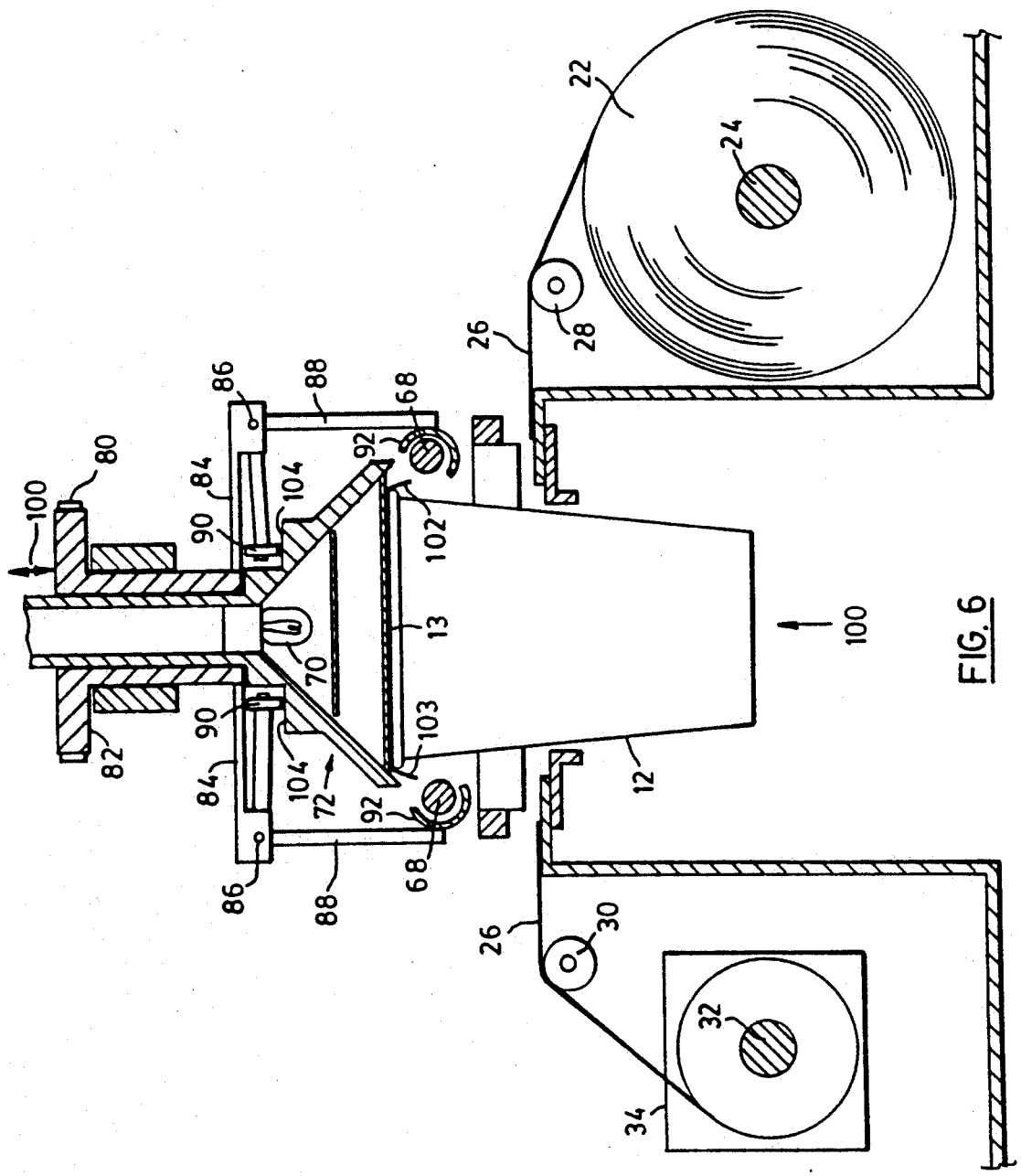
FIG. 6 is a view similar to FIG. 5 with the container in a raised position.

Turning now to FIG. 6, the operation of an instant device can now be understood. In FIG. 6 the container 12 has been raised in the direction of arrow 100. This has had the effect of pushing the film 26 upwardly into engagement with the knife heated film cutter blade 94. This has caused a cut portion of the film shown as 102 to be draped across the top 13 of the container 12. At this point the hood 72 is holding the cut piece of film 102 generally in place. As the container 12 is raised further, the hood 72 is also raised. Rollers 90 then contact a ledge 104 formed on the outer surface of the hood 72. Further upward movement causes the movement of the first radiant energy source 68 about the pivot point 86 until the first radiant energy source 68 is closely adjacent to a draped over edge of cut portion 102 shown as 103. Contact is then made at a limit switch, as explained below in respect of FIG. 11, which energizes a motor 99 (shown in FIG. 4). Upon energization of the motor 99, the belt 80 revolves causing the rotating arms 84 to revolve rotating the first radiant energy source 68 about the periphery of the top of the container 13. Simultaneously with the energization of the motor 99 and the rotation of the first radiant energy source 68, the first radiant energy source 68 is energized to cause radiant energy to be directed towards the dangling edge 103 of the cut portion 102 of the said film 26.

It will be appreciated that the preferred invention causes the first radiant energy source 68 to move into position closely adjacent the downward edge 103 of the cut portion 102. Such movement is preferred because radiant energy obeys the inverse squared rule in which the amount of energy is proportional to an inverse of the square of the distance from the source. By locating the first radiant energy source 68 close prior to being energized, more energy can be usefully used and focused away, for example, from an operator's hands. Also, by the pivoting action, the operator's hands are kept clear of the energy source 68, until the container 12 is in position.

After a predetermined length of time, the first radiant energy source 68 is de-energized and the second radiant energy source 70 is energized by a timer as described in more detail below. The second radiant energy source 70 energy is directed through the glass shield 74 onto an energy absorbing body 76. This transfer of heat causes a shrinking of the top portion across container 12 of the cut portion 102. Thereafter, the sealed container 12 can be lowered and removed from the apparatus.

A preferred type of energy absorbing body 76 is a darkened aluminum screen. The body 76 is placed very closely adjacent the top portion of the cut section 102 and may be in contact therewith. The darkened screen or body 76 absorbs energy and transfers it onto the top portion. It will be appreciated that aluminum is a suitable material because it will cool rapidly, when the energy source 70 is shut off, thereby preventing premature shrinkage of a top portion on a subsequent container upon being first introduced into the hood 20.

It has been found that the preferred radiant energy sources are Tungsten Halogen Lamps. About 70% of the energy produced by these lamps is in the preferred wavelength range of the infrared (750 millimicrons and beyond).

These lamps are compact, durable, inexpensive and readily available. Lamps in the range of 200 to 300 watts are suitable. It will be appreciated by those skilled in the art that other energy sources which produce sufficient infrared radiant energy may also be used.

It is also to be noted that the radiant energy emitted by such an energy source can be turned on and off instantaneously and focused and directed to the location it is desired, without stray heat energy being produced, and the energy source does not have to be on continuously, or on standby in readiness for a container, which is the case of prior art hot air systems.

Turning now to FIG. 4, the belt 80, pulley 82 and drive motor 99 are all shown. Also are shown two rotating arms 84 and two first radiant heaters 68. It will be appreciated by those skilled in the art that fewer or more radiant heating elements could be used according to space requirements and preference. However, when the drive motor operates at 100 rpm, two radiant heat means 68 provides good results. By varying the size of the pulley 82, the speed of revolution of the first radiant energy source 68 can also be varied. Good results have been achieved when the pully 82 is configured to cause the first radiant energy source 68 to rotate at 100 rpm.

It will also be appreciated that the spinning first radiant energy source 68 could be replaced with a row of fixed position bulbs. However, the process would be slightly more difficult to control, since the total energy output would likely be greater, and more energy expensive. Thus, the moving first energy source 68 is preferred.

Figure 11:
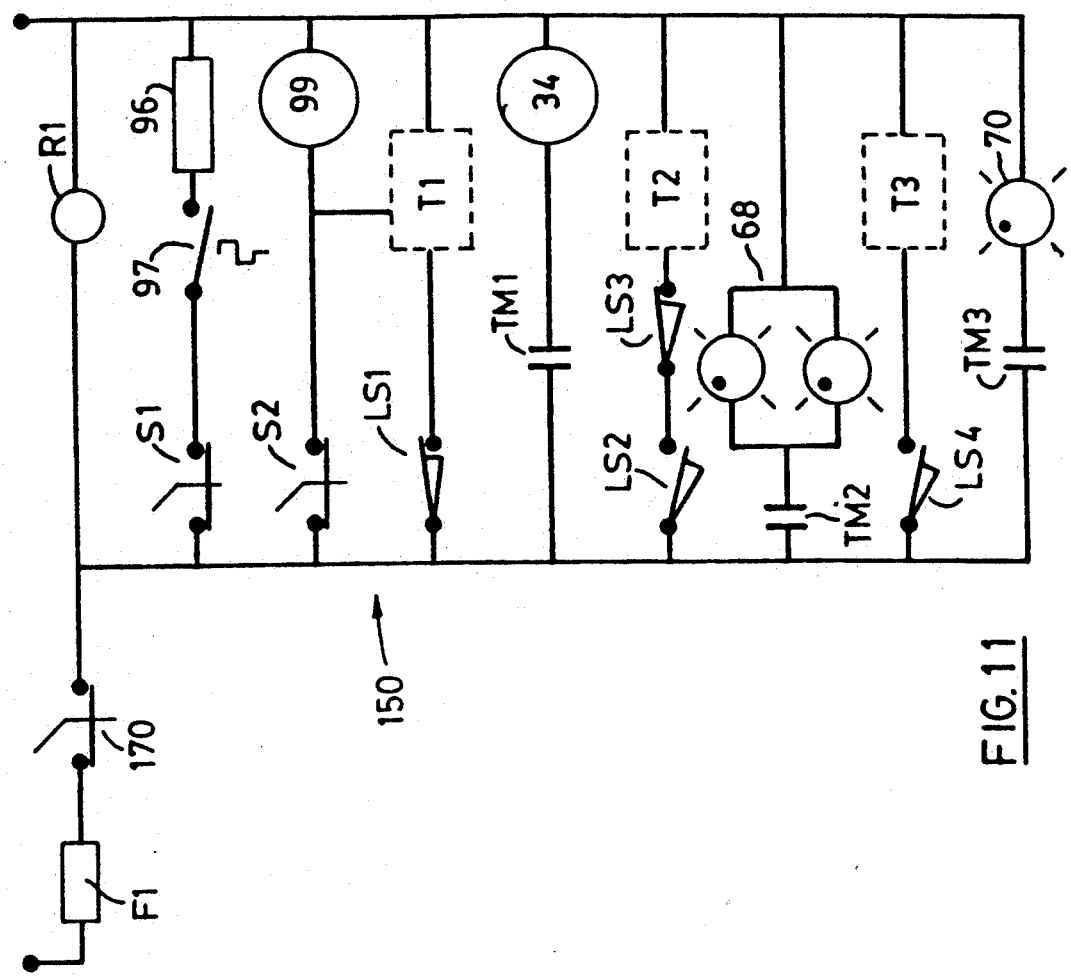
FIG. 11 is a schematic sketch of an electronic control circuit for the present invention.

Turning to FIG. 11, a schematic of an electrical system 150 for the instant invention is disclosed, which sets out in more detail the interaction between the container 12 and hood 72 location, and the activation of the various components described above.

One of the characteristics of the electrical design is that it must compensate for the varying rates that the container 12, which is moved by a human hand, enters and leaves the device 10.

In the preferred embodiment the raising and lowering of hood 72 and the motion of locator 40 will trigger micro-switches which engage timers as described below. Certain events must take place as hood 72 is raised and other events must take place when hood 72 is lowered.

Referring to the wiring system 150, F1 is a fuse. When the main switch 170 is turned on, a pilot light R lights up. Then, switches S1 and S2 are manually turned on. As shown, S1 turns on resistance heater 96, which heat the knife 94. A thermostatic control is shown at 97. When S2 is turned on, it activates motor 99 and also signals timer T1. Also shown is a relay TM-1. The timer T1 engages motor 34 and advances the film 26 for a single "space", which is determined by the time set on timer T1. Thus when the machine is activated and ready to operate by turning on switch S2, a fresh piece of film 26 is automatically presented. Switch LS1 is situated on plate 42, (shown in ghost outline in FIG. 7) so that when guide 46 rotates outwardly on withdrawal of the container, LS1 also signals timer T1 which engages motor 34 and advances the film in a like manner.

Also shown are switches LS2 and LS3 which close when hood 72 moves upward. These switches activate a second timer T2 which activates relay TM-2 which in turn activates first radiant energy source 68. On the downward motion switch LS3 opens and thereby prevents timer T2 from activating source 68 again.

On the downward motion of hood 72, switch LS4 closes, which activates timer T3 which through a relay TM-3, activates radiant energy source 70 for a predetermined time.

FIG. 12 shows in schematic form the microswitch interconnections. On the left hand side of FIG. 12 are the belt 80 around the pulley 82. A shaft 200 extends upwardly from the top hood 72. A connecting rod 202 is attached to shaft 200, and will rise and subside with the hood 72 being raised and lowered. Remote from shaft 200 there is a rack 204 connected to the rod 202 which interacts with a pinion 206, in a manner shown by double ended arrows 208. Also shown are a cam shaft 10 attached to eccentric cams 212.

Shown in FIGS. 13A and 13B are the means of closing electrical circuits upon rotation of the cam shaft 10 by the pinion 206. A secondary roller 214 is located on a pivot arm 216. When cam 212 is rotated in one direction an electrical spring clip 218 is forced into contact with an electrical contact 220 closing a circuit. Upon being rotated in an opposite direction, the cam 212 urges the pivot arm 216 up and out of the way, and does not close the circuit, as shown in FIG. 13B.

It can now be appreciated that the present invention uses radiant energy from the radiant energy sources to effect shrinkage. Radiant energy is preferred, because it travels relatively unimpeded through transparent mediums such as air or transparent film. The preferred radiant energy source is a Tungsten-Halogen bulb, which is described in more detail above. The present invention has process parameters for heating which depend upon an absorbing means for the radiant energy, and in particular, how close any absorbing means conforms to a theoretically ideal "black body". An ideal "black body" completely absorbs all radiant energy that strikes it and thus is capable of radiating that same energy outward.

The way in which the present invention seals heat shrinkable thin film onto a container, is to employ a first means to transfer heat to the downwardly extending portion of the cut piece of thin film. In this sense, the first means can comprise adapting the thin film to absorb energy, interposing an absorbent body adjacent to thin film, or adapting the area of the container just below the rim to become energy absorbing. The thin film can be adapted to absorb energy by being made from a tinted material, or by being coated with an energy absorbent coating, for example, printing. The ability of the opaque or coated film to absorb radiant energy will vary depending upon what type of tinting or coating is used. A darker or more opaque film will absorb more energy.

An example of a preferred interposed absorbent body is a darkened aluminum screen 112, which moves closely adjacent the edge 103. The darkened portion of the screen will absorb energy and then radiate it, giving rise to heat. The heat will be transferred to the air adjacent to the film, then to the film which will shrink the film.

The container may be adapted to absorb radiant energy, and thus produce heat in a preferred location, by including a darkened band 15 in the area where heat generation is desired, such as just below the rim. For aesthetic reasons, black bands may not be acceptable, but other coloured bands will also work. With a cooler colour, the exposure to the radiant energy source may need to be slightly longer. However, the length of time of exposure to the radiant energy source can be adjusted in the present invention through adjustments made to the timer T2. A gap 17 may be incorporated into the band 15 to permit the end user to lift the shrunken cover off the container if so desired.

In some circumstances, it may be desirable to urge the film onto the cup. Therefore, the present invention also comprehends the use of a spring wire 110, which trails (or leads) the revolving first radiant heat means 68, and urges the edge 103 into contact with the container 12 just below the top 13.

It will be appreciated by those skilled in the art that the foregoing description relates to a preferred embodiment and that various modifications can be made without departing from the broad scope of the appended claims. Some of these modifications have been discussed above and others will be apparent to those skilled in the art.

We claim:

1. A device for heat shrinking a cover onto an open-topped container, said device comprising: a housing having an opening to receive said container said housing having,
    a strip of heat shrinkable thin film located above said opening;
    a cutting means positioned close to said thin film for cutting said thin film upon said thin film being urged onto said cutting means by said container;
    a hood for holding a cut piece of said film in place across said open top of said container, wherein said cut piece includes a portion extending from under said hood downwardly around an upper outer rim of said container;
    a first radiant energy source for directing energy toward said downwardly extending portion of said cut piece of film;
    a second radiant energy source for directing energy towards said portion of said film extending across said open top of said container;
    a switch means for intermittently energizing said first radiant energy source and
    a timer means for de-energizing said first radiant energy source after a predetermined time and for energizing said second radiant energy source; wherein said thin film is at least partially opaque to said radiant energy and upon being exposed to said first radiant energy source said thin film heats up and shrinks onto said rim of said open topped container and upon being exposed to said second radiant energy source the cut portion of the film is shrunk across the top of the container to form a spill resistant cover.

2. A device according to claim 1 wherein said thin film is made at least partially opaque by being tinted.

3. A device according to claim 1 wherein said thin film is made at least partially opaque by being coated with an energy absorbing coating.

4. A device as claimed in claim 1 wherein said housing includes a dispensing reel and a take-up reel for a continuous strip of said thin film.

5. A device according to claim 4 wherein said thin film is a biaxial film of between 40 to 120 gauge thickness.

6. A device according to claim 5 wherein said thin film has a width greater than the width of said cutting means to form a trim after said cut portion is made, said trim being sufficient to allow said film to be advanced by a tensile force in said trim without tearing.

7. A device according to claim 1 further including a locator which comprises at least one guide plate.

8. A device according to claim 7 wherein said locator comprises an opposed pair of guide plates, at least one of which is spring loaded.

9. A device according to claim 7 wherein said locator comprises an opposed pair of spring loaded guide plates having curved container contacting surfaces for centering the container.

10. A device according to claim 1 wherein said cutting means comprises a heated steel rule.

11. A device according to claim 10 wherein said cutting means cuts a cut piece of thin film having a symmetrical overhang around all edges of said container.

12. A device according to claim 10 wherein said cutting means is heated by a resistance heater to a temperature of between 275° F. and 400° F.

13. A device accordign to claim 1 wherein said hood covers said cut portion of said film lying across said top of said container to prevent said covered portion from being directly exposed to energy from said first radiant energy source.

14. A device accordign to claim 13 further including a piercing tool to make at least one hole in said cut piece of thin film.

15. A device as claimed in claim 1 wherein said film includes a pattern of discrete opaque dots forming a predetermined pattern to cause perforations upon exposure to said second radiant energy source.

16. A device according to claim 1 further including a motor, a drive means connecting said motor to said first radiant energy source and wherein said switch means energizes said motor as well as said first radiant energy source, and said first radiant energy source si rotated around said rim.

17. A device according to claim 16 wherein said first radiant energy source is pivotally mounted on an arm, and said hood is displaceable, and on displacement of said hood, said arm is pivoted about a pivot point to cause said first radiant energy source to be positioned adjacent said downwardly extending portion of said cut piece of thin film.

18. A device according to claim 17 in which said hood further includes a ledge, and said arm further includes a roller which rolls along said ledge upon rotation of said first radiant energy source.

19. A device according to claim 17 wherein said arm further includes a means for urging said portion of said film into contact with said rim.

20. A device according to claim 16 when said first radiant energy source rotates at about 100 rpm.

21. A device as claimed in claim 16 wherein said timer means allows said first radiant energy source to be energized for at lest a full revolution of said first energy source around said rim of said container.

22. A device as claimed in claim 21 wherein said device includes at lest two first radiant energy sources and said timer means allows said tow first radiant energy sources to be energized for at least one half revolution around said rim of said container.

23. A device as claimed in claim 1 wherein said switch means comprises at least one contact operated limit switch.

* * * * *